C. W. WEAVER.
FAUCET.
APPLICATION FILED JAN. 10, 1913.
1,097,492.
Patented May 19, 1914.
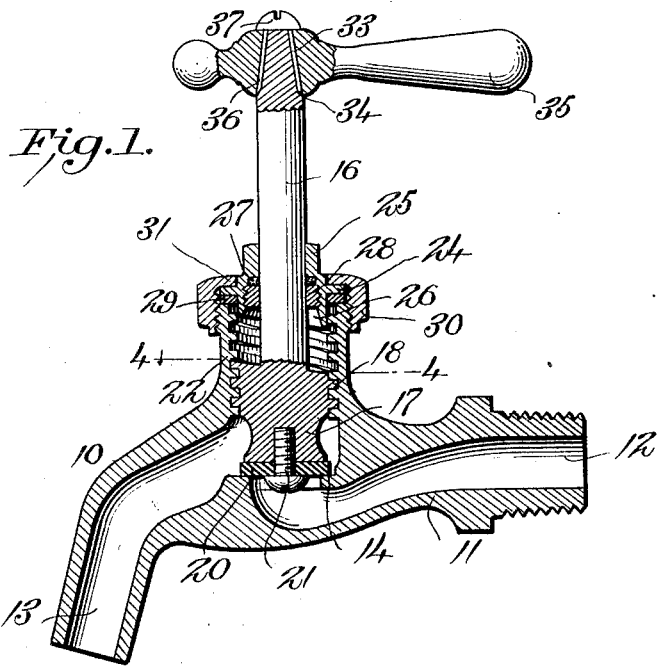
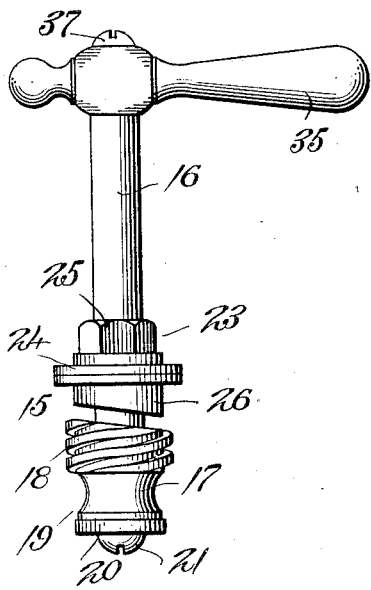
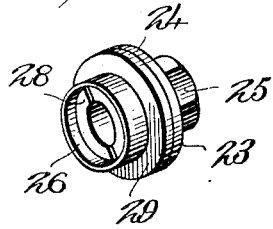
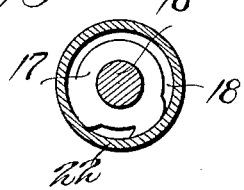
Witnesses
Inventor
C. W. Weaver,
By Victor J. Evans
Attorney

UNITED STATES PATENT OFFICE.

COURTLAND W. WEAVER, OF TORONTO, ONTARIO, CANADA, ASSIGNOR OF ONE-HALF TO VICTOR F. MAULSON, OF TORONTO, CANADA.

FAUCET.

1,097,492.  Specification of Letters Patent.  Patented May 19, 1914.

Application filed January 10, 1913. Serial No. 741,266.

*To all whom it may concern:*

Be it known that I, COURTLAND W. WEAVER, a subject of the King of Great Britain, residing at Toronto, in the Province of Ontario and Dominion of Canada, have invented new and useful Improvements in Faucets, of which the following is a specification.

The invention relates to faucets and has for an object to provide a quick opening and closing faucet.

The invention embodies, among other features, a faucet in which but a slight movement of the handle moves the valve into open or closed position, and in which the stroke of movement of the valve with respect to the valve seat of the casing of the faucet can be increased or decreased to control the flow of fluid through the casing of the faucet, thus increasing or decreasing the swing of the handle in actuating the valve.

In the further disclosure of the invention reference is to be had to the accompanying drawings, constituting a part of this specification, in which similar characters of reference denote corresponding parts in all the views, and in which:

Figure 1 is a vertical sectional view of the faucet; Fig. 2 is a side elevation of the valve and operating mechanism therefor, removed from the casing of the faucet; Fig. 3 is a perspective view, looking at the cam portion of the adjusting member; and Fig. 4 is a horizontal sectional view taken on the line 4—4 in Fig. 1.

Referring more particularly to the views, I employ a faucet 10 comprising the usual faucet casing 11 having an inlet end 12 and an outlet end 13, a valve seat 14 being formed in the casing 11 between the inlet and outlet 12 and 13, as shown.

A valve operating mechanism 15 includes a stem 16 terminating at the lower end thereof in a head 17 having a quick-thread 18, the lower end of the said head 17 forming a valve 19 by mounting a washer 20 on the lower end of the head, the said washer being secured thereto by a screw 21 passing longitudinally in the head as shown, it being understood that any convenient form of valve 19 can be provided at the lower end of the head, the said valve being normally adapted to repose on the valve seat 14 in the casing 11. The threaded portion of the head has threaded connection with a tubular portion 22 of the casing 11 and by providing the quick-thread 18 it will be readily seen that only a slight rotation of the stem 16 is necessary in order to seat or unseat the valve 19.

An adjusting member 23 is mounted to slide on the stem 16 and comprises a collar 24 having an integral nut 25 with a depending cam member 26 formed with the collar 24, a suitable packing 27 being arranged to encircle the same within the cam member and secured therein by a lock nut 28 also lying within the cam member 26, the said collar 24 being further provided with a washer 29 encircling the cam member at the inner end thereof and at the point of formation of the cam member with the collar.

Now when the head 17 has been threaded in the tubular portion 22 of the casing 11, a retaining nut 30 is threaded on the upper end of the tubular portion 22 of the casing and is provided with a flange 31 engaging the collar 24 to retain the adjusting member 23 in position on the casing. The upper end of the stem 16 is tapered and provided with a series of longitudinal serrations 33, the said upper end of the stem being adapted to be received in a tapered opening 34 formed in a handle 35, the wall of the said opening 34 being provided with a series of vertical notches 36 in which the serrations 33 of the stem are received, thus locking the handle 35 on the stem and preventing rotation of the handle without rotating the stem, a screw 37 being preferably threaded into the stem from the upper end thereof, with the head of the screw engaging the handle, thus securely locking the handle on the stem.

Now referring to Fig. 1 it will be seen that when the faucet is assembled, the nut 25 of the adjusting member 23 will project outwardly beyond the retaining nut 30 so that a wrench can be readily applied to the nut 25 for the purpose of actuating the adjusting member 23, and it will be further seen that when the handle 35 is actuated to open the valve 19 with respect to the valve seat 14, the upper end of the threaded head 17 will engage the cam member 26 of the adjusting member 23, thus limiting the upward movement of the head and consequently also limiting the throw of the handle 35. It will be apparent that only a slight turn of the handle is necessary to move the valve into open or closed position, this being due to the provision of the quick-thread 18 on the head 17. If, however, it is desired to not only reduce the throw of the handle but also shorten the vertical movement of the valve with respect to the valve seat, thus restricting the flow of fluid through the casing 11, the application of a wrench or other implement to the nut 25 will result in the rotation of the adjusting member 23. Now referring to the views, it will be apparent that the upper face of the head 17 is inclined to conform to the inclination of the lower edge of the cam member so that, normally, the cam member will seat smoothly and evenly upon the upper face of the head, it being thus seen that the length of the head 17 varies on account of the inclination of the upper face thereof. A slight adjustment of the adjusting member 23 will adjust the stroke of the valve to various distances between the shortest and greatest stroke thereof, it being understood that the adjustment of the throw of the valve is accomplished without removing any of the parts of the faucet.

Having thus described my invention, I claim:

1. In a faucet, the combination with a casing, of a valve seat formed therein, a stem depending in the casing, a head carried by the stem and having threaded connection with the casing, the said head having a quick-thread thereon, a valve formed at the lower end of the said head and adapted to normally seat on the said valve seat, with the upper face of the said head inclined, a handle for the stem, and an exteriorly adjustable cam-like member loose on the stem and revoluble on the casing, the said member being adapted to engage the inclined face of the said head for adjusting the range of vertical movement of the said stem relatively to the said casing.

2. In a faucet, the combination with a casing, of a stem revoluble therein, a valve carried by the stem, and adapted to engage the valve seat in the casing, a head on the valve having its upper face inclined, and exteriorly adjustable means revoluble on the casing and loosely encircling the said stem for engagement with the inclined face of the head for adjusting the range of vertical movement of the valve relatively to the said valve seat.

3. In a faucet, the combination with a casing, of a stem revoluble therein, a valve carried by the stem and adapted to engage the valve seat in the casing, a head on the valve having its upper face inclined, and an exteriorly adjustable cam-like member on the said casing and adapted for engagement with the inclined face of the said head for adjusting the range of vertical movement of the valve relatively to the said valve seat.

In testimony whereof I affix my signature in presence of two witnesses.

COURTLAND W. WEAVER.

Witnesses:
D. S. TOVELL,
R. S. CHILTON.

---

Copies of this patent may be obtained for five cents each, by addressing the "Commissioner of Patents, Washington, D. C."